(12) United States Patent
Mason et al.

(10) Patent No.: US 7,954,443 B2
(45) Date of Patent: Jun. 7, 2011

(54) BOAT WINDSHIELD WITH VENT STRUCTURE

(75) Inventors: Christopher A. Mason, Holmes Beach, FL (US); Sherman E. Whited, II, Sarasota, FL (US)

(73) Assignee: Taylor Made Group, LLC, Gloversville, NY (US)

( * ) Notice: Subject to any disclaimer, the term of this patent is extended or adjusted under 35 U.S.C. 154(b) by 440 days.

(21) Appl. No.: 12/248,477

(22) Filed: Oct. 9, 2008

(65) Prior Publication Data

US 2009/0211512 A1    Aug. 27, 2009

Related U.S. Application Data

(60) Provisional application No. 60/978,664, filed on Oct. 9, 2007.

(51) Int. Cl.
*B63B 17/00* (2006.01)
*B63B 17/02* (2006.01)
*B63B 19/00* (2006.01)

(52) U.S. Cl. .......................................... 114/361; 114/177

(58) Field of Classification Search ................... 114/343, 114/361, 364, 177; 296/84.1
See application file for complete search history.

(56) References Cited

U.S. PATENT DOCUMENTS 2,445,413 A * 7/1948 Webster ........................... 454/76
5,174,522 A * 12/1992 Hubbell ......................... 244/1 R

* cited by examiner

*Primary Examiner* — Daniel V Venne
(74) *Attorney, Agent, or Firm* — Nixon & Vanderhye P.C.

(57) ABSTRACT

A boat windshield is described including a transparent pane. A rail is disposed adjacent and secured to one of either the bottom or the top edge of the transparent pane. An opening is defined through the rail. An air intake housing is secured to the front surface of the rail. An air intake opening and passageway are defined in the air intake housing. An air discharge housing is secured to the rear surface of the rail. An air discharge opening and passageway are defined in the rear intake housing. The air intake passageway, the opening through the rail, and the air discharge passageway define an air pathway from the front surface to the rear surface of the rail. The air discharge opening is positioned adjacent to the rear surface of the transparent pane to direct air along the rear surface of the transparent pane upon exiting the air discharge housing.

18 Claims, 6 Drawing Sheets

BOAT WINDSHIELD WITH VENT STRUCTURE

CROSS-REFERENCE TO RELATED APPLICATIONS

This is a non-provisional patent application based upon and claiming the benefit of priority to U.S. Provisional Patent Application 60/978,664, filed on Oct. 9, 2007, the contents of which are incorporated herein by reference.

FIELD OF THE INVENTION

The invention relates to a vent for a windshield for a boat. In particular, the invention relates to a vent that permits air to be directed in a manner to reduce condensation of moisture, especially on the interior surface of the windshield.

DESCRIPTION OF THE RELATED ART

In the boating industry, it is common for a windshield to be mounted on the deck of a boat (or other suitable type of watercraft) without any provision for reducing the occurrence of condensate on the interior surface of the windshield.

Unlike most automobiles, the cockpit of a medium-sized to large-sized boat typically is opened to the atmosphere (or to the environment). Typically, there is no provision for an anti-fogging system. As a result, when condensation forms on the interior surface of a windshield, the boater is required to wipe the condensation from the window.

While this difficulty has been accepted as unavoidable, boaters increasingly have expressed a desire for an apparatus that may eliminate, or at least greatly reduce, the formation of condensation on the interior surface of the windshield.

This desire by boaters remains unaddressed by the prior art.

SUMMARY OF THE INVENTION

It is, therefore, one aspect of the invention to provide a mechanism to reduce the formation of condensation on the interior of a boat windshield.

It is yet another aspect of the invention to provide a simple mechanism removes condensation from the interior surface of a boat windshield, once formed.

One embodiment of the invention provides for a vent positioned at the bottom of a boat windshield, permitting air to be directed from a position exterior to the windshield, through the vent, to an air deflector. The deflector directs the air across the interior of the windshield to reduce or eliminate the formation of condensation on the interior surface of the windshield.

Another embodiment of the invention provides for the positioning of a vent at a top of a boat windshield, permitting air to be directed from a position exterior to the windshield, through the vent, to an air deflector. The deflector directs the air across the interior of the windshield to reduce or eliminate the formation of condensation on the interior surface of the windshield.

Still another aspect of the invention is to provide a vent closure system, permitting a use to selectively open or close a vent positioned at the bottom of the boat windshield, the top of the boat windshield or at both the bottom and the top of the boat windshield.

With respect to specific embodiments, the invention provides for a boat windshield that includes a transparent pane, defining a bottom edge and a top edge and defining a front surface and a rear surface. A rail is disposed adjacent and secured to one of either the bottom or the top edge of the transparent pane, the rail defining a front surface and a rear surface. An opening is defined through the rail. An air intake housing is secured to the front surface of the rail. An air intake opening is defined in the air intake housing. An air intake passageway is defined by the air intake housing. An air discharge housing is secured to the rear surface of the rail. An air discharge opening is defined in the rear intake housing. In addition, an air discharge passageway is defined by the rear intake housing. The air intake passageway, the opening through the rail, and the air discharge passageway define an air pathway from the front surface to the rear surface of the rail. The air discharge opening is positioned adjacent to the rear surface of the transparent pane to direct air along the rear surface of the transparent pane upon exiting the air discharge housing.

The invention also provides for a closure system provided in the one of either the air intake housing or the air discharge housing to permit selective closure of the air pathway.

With respect to the closure system, the invention provides for a first plate, a plurality of first openings defined through the first plate, a second plate disposed slidably behind the first plate, and a plurality of second openings defined through the second plate. The first and the second plates are slidably disposed adjacent to one another such that, in an open position, the first and second openings are in register with one another thereby permitting air flow through the air passageway and, in a closed position, the first and second openings are not in register with one another thereby preventing air flow through the air passageway.

Further still, the invention provides for a vent for a boat windshield. The vent includes an air intake housing securable to a front surface of a rail, an air intake opening defined in the air intake housing, an air intake passageway defined by the air intake housing, an air discharge housing securable to a rear surface of a rail, an air discharge opening defined in the rear intake housing, and an air discharge passageway defined by the rear intake housing. The air intake passageway and the air discharge passageway define an air pathway and the air discharge opening is positionable adjacent to a rear surface of the transparent pane to direct air along the rear surface of the transparent pane upon exiting the air discharge housing.

Other aspects of the invention will be made apparent to those skilled in the art from the description that follows and from the drawings appended hereto.

BRIEF DESCRIPTION OF THE DRAWINGS

The invention will now be described in connection with the drawings appended hereto, where like reference numerals refer to like structures, features, and elements, in which.

DESCRIPTION OF EMBODIMENT(s) OF THE INVENTION

Figure 1:
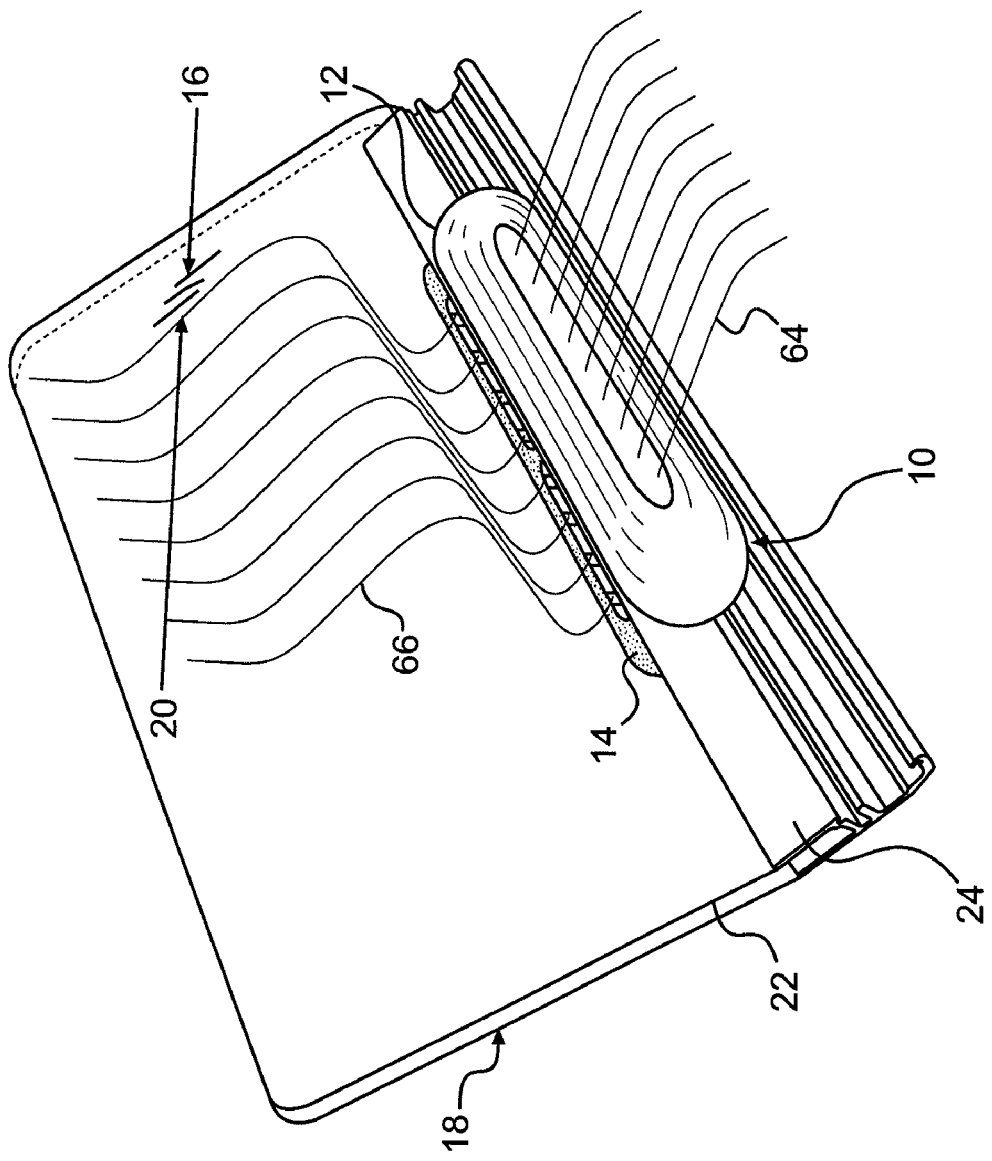
FIG. 1 is a perspective illustration of one embodiment of the invention, showing an air vent positioned at a bottom portion of a boat windshield.

FIG. 1 provides a perspective illustration of the vent 10 of the invention. The vent 10 includes an air intake 12 and an air discharge 14. The air intake 12 is positioned at a front side 16 of a windshield 18. The air discharge 14 is positioned at a rear side 20 of the windshield 18. The windshield 18, at least in the illustrated embodiment, includes a transparent pane 22 and a bottom rail 24. The transparent pane 22 may be made of any transparent material suitable for the windshield 18. Typically, the transparent pane 22 is made from glass. As should be appreciated by those skilled in the art, however, the transparent pane 22 may be made from a substitute material, such as polycarbonate, clear acrylic, or the like, without departing from the scope of the invention.

The bottom rail 24, at least in the illustrated embodiment is constructed from aluminum, largely because of aluminum's resistance to corrosion and its light weight. Of course, the bottom rail 24 may be constructed from any suitable material including, but not limited to, steel, stainless steel, composite materials, plastics, etc.

As should be appreciated by those skilled in the art, the bottom rail 24 typically is affixed to the deck 26 of a boat (not illustrated in FIG. 1). As should be appreciated by those skilled in the art, the term "deck" is used broadly to refer to the top portion of a boat that includes the cockpit and any other person-accessible areas incorporated into the boat.

Figure 2:
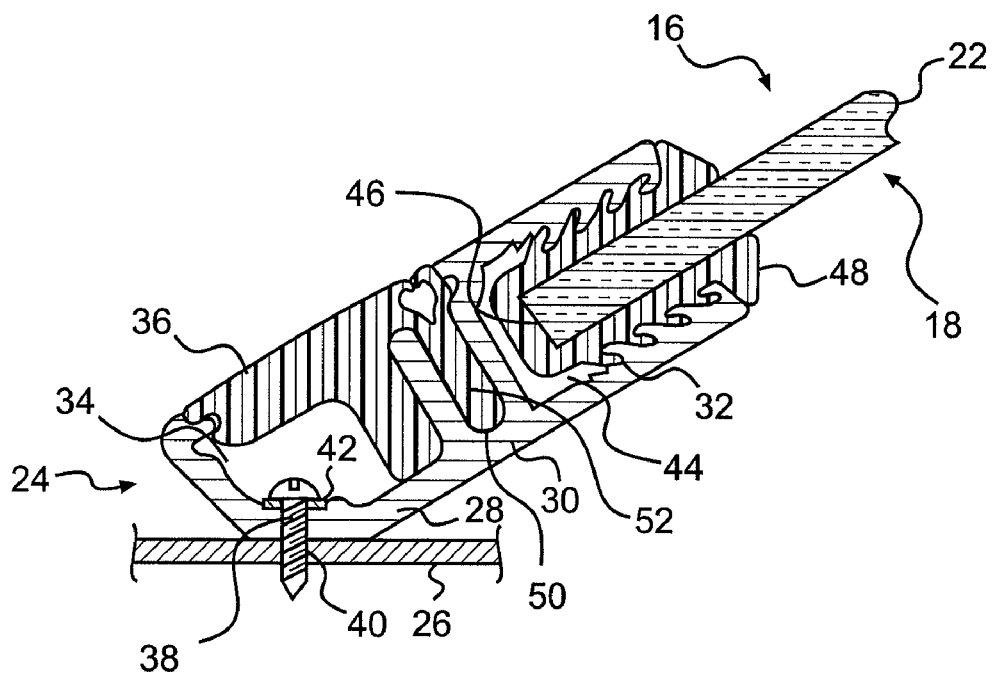
FIG. 2 is a cross-sectional side view illustration of one embodiment of a bottom rail for a windshield.

FIG. 2 provides an enlarged detail of the bottom rail 24, to which reference is now made to facilitate a discussion of the invention. The bottom rail 24 typically is an extruded metal component, although it may be constructed via any other suitable technique other than extrusion. Details of one embodiment of the bottom rail 24 in are described in greater detail in co-pending U.S. patent application Ser. No. 10/241, 193, filed on Sep. 30, 2005, the contents of which are incorporated herein by reference. The bottom rail 24 includes a bottom portion 28, a middle portion 30, and a top portion 32. The bottom portion 28 defines a cavity or groove 34 longitudinally along the length of the bottom rail 24. The groove 34 may be capped with an insert 36 so that the interior of the groove 34 is not visible. The insert 36 may be made from any suitable material. However, in the illustrated embodiment, the insert 36 is made from an elastomeric material so that the insert 36 may be pressed into the groove 34, as illustrated.

The bottom portion 28 of the bottom rail 24 includes a plurality of holes 38, permitting a threaded fastener 40 to be inserted therethrough. In a common example, the bottom rail 24 is affixed to the deck of a boat via threaded fasteners 40, such as screws. In the embodiment illustrated in FIG. 2, the threaded fasteners are screws 40 that fasten the bottom rail 24 to the deck 26, a portion of which is also illustrated. A washer 42 may be employed as a backing of the head of the crew 40 to help prevent counter-rotation of the screw 40, once installed in the appropriate location. While a screw 40 is shown in this embodiment, it is contemplated that other suitable fastening alternatives mat be employed without departing from the scope of the invention. For example, non-threaded fasteners may be used either alone or in combination with a suitable adhesive.

The top portion 32 of the bottom rail also includes a groove or opening 44 therein. The groove 44 is shaped to receive a bottom edge 46 of the transparent pane 22. While it is possible to affix the transparent pane 22 directly into the top portion 32 of the bottom rail 24, it is preferred to include an insert 48 in the grove 44. As would be appreciated by those skilled in the art, the insert 48 provides a sealing engagement between the transparent pane 22 and the top portion 32 of the bottom rail 24, among other advantages.

The middle portion 30 of the bottom rail 24 includes a groove or opening 50 extending along its length. The groove 50 is intended to receive one or more fasteners therein, specifically for the purpose of affixing the male portion of a snap fastener to the bottom rail 24. The snap fastener permits a canopy or canvas cover to be affixed removably to the bottom rail 24, as would be appreciated by those skilled in the art.

The groove 50, which is a part of the groove 34, includes a portion 52 of the insert 36, which is discussed above. As is apparent, the insert 36 covers both of the grooves 34 and 50. While not illustrated, the groove 50 is provided so that threaded fasteners may be inserted thereinto. As should be appreciated by those skilled in the art, the threaded fasteners affix the male portions of snap fasteners to the bottom rail 24. This permits a flexible cover, such as a canvas cover, to be attached to the bottom rail 24.

Figure 4:
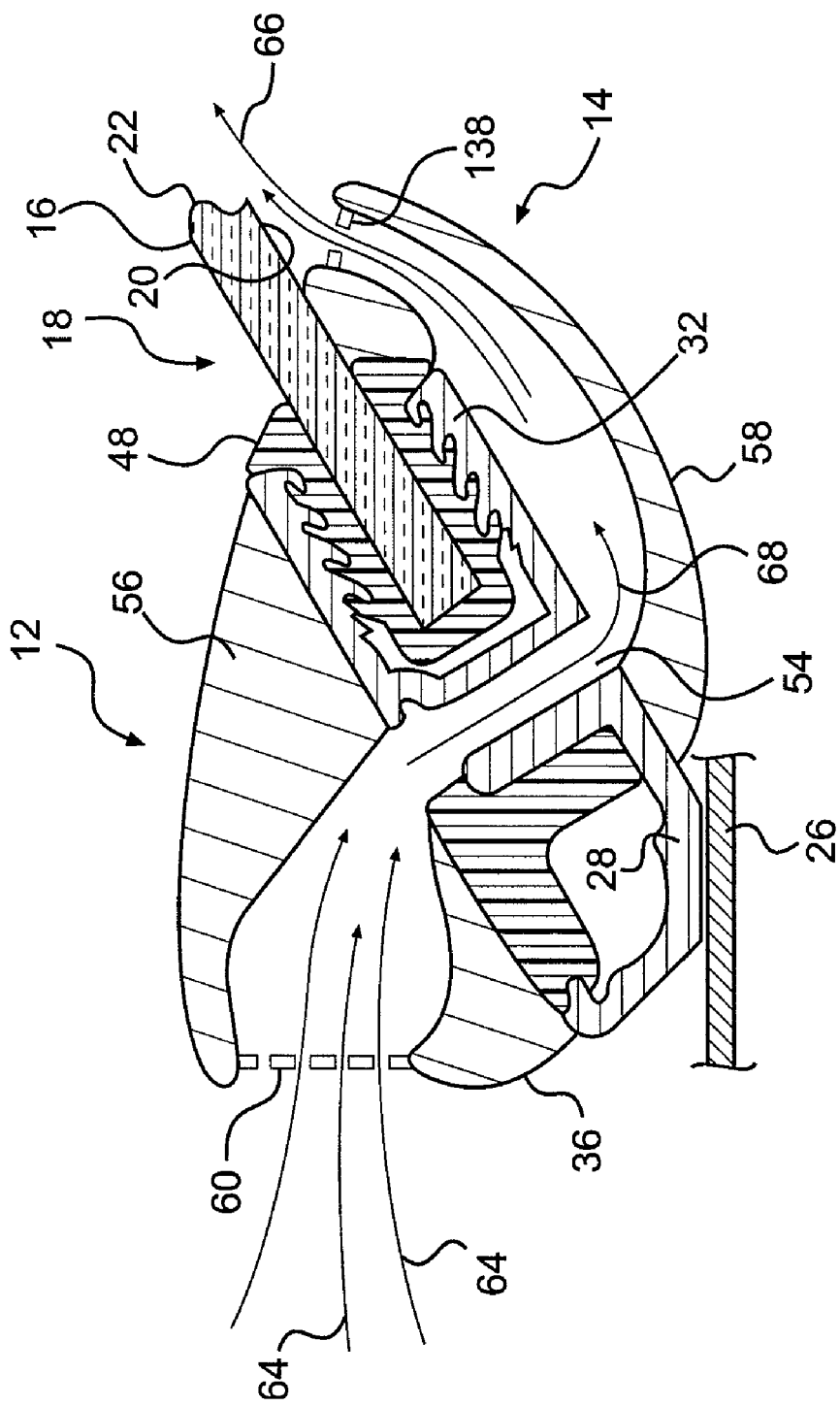
FIG. 4 is a cross-sectional side view illustration of one embodiment of a vent positioned at a bottom of the boat windshield.

The groove 50 also provides a convenient location for providing an opening 54, which is part of the vent 10 of the invention. The opening 54 is illustrated in FIG. 4. Details of the vent 10, which is illustrated in cross-section in FIG. 4, are also shown. Specifically, the air intake 12 includes an air intake housing 56 disposed on the front side 16 of the windshield 18. The air discharge 14 includes an air discharge housing 58 disposed on the rear side 20 of the windshield 18. As also illustrated in FIG. 4, the air intake housing 56 includes an intake grill 60. The intake grill 60 prevents the ingestion of macroscopic materials, such as insects, by the vent 10. Similarly, the air discharge housing 58 may include a discharge grill 62, which may be employed for any number of purposes, including aesthetic ones.

With continued reference to FIG. 4, air from the front side 16 of the windshield 18 is forced into the air intake 12 when the boat moves in a forward direction. The intake air flow is indicated by arrows 64. The discharge air flow is indicated by arrows 66. The interior air flow, which encompasses the air flow within the vent 10, is indicated by arrows 68. As FIG. 4 makes apparent, the intake air 64 passes through the intake grill 60, is routed through the opening 54 in the bottom rail 24, and exits from the discharge housing 58 at a position near the rear side 20 of the transparent pane 22. The discharge housing 58 is positioned such that the air discharge 66 is directed along the rear side 20 of the transparent pane 22, thereby removing any condensate that may have collected on the rear side 20 of the transparent pane 22.

Figure 3:
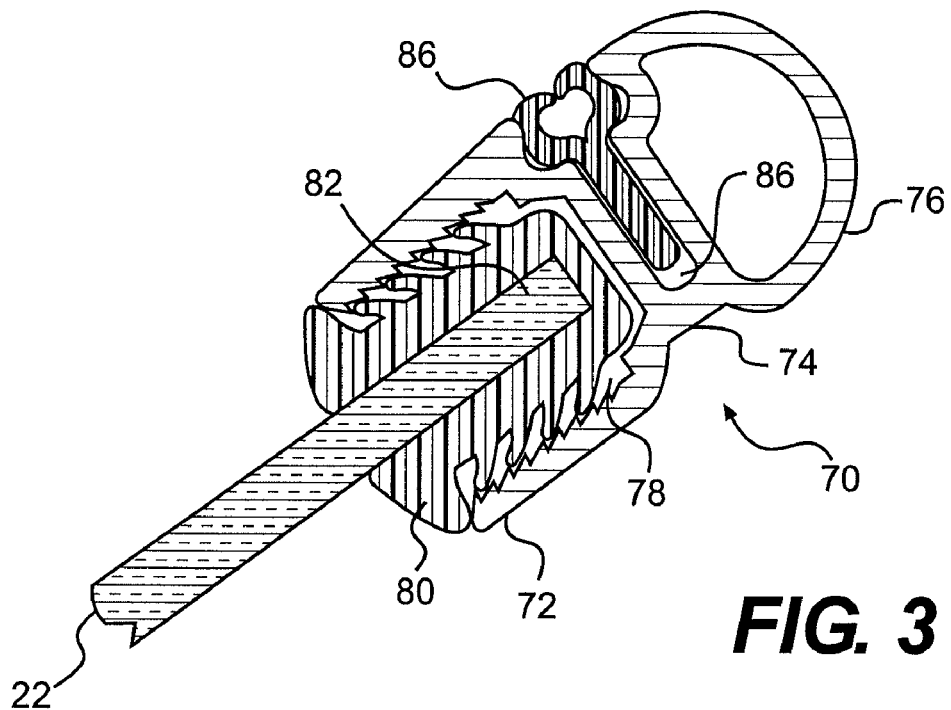
FIG. 3 is a cross-sectional side view illustration of one embodiment of a top rail for a windshield.

As should be appreciated by those skilled in the art, the bottom rail 24 is not the only location where a vent 10 may be positioned. Since windshields 18 for boats typically also include a top rail 70, illustrated in FIG. 3, the top rail 70 also becomes one possible location for inclusion of a vent.

Like the bottom rail 24, the top rail 70 is an elongated member, typically an aluminum extrusion. Like the bottom rail 24, the top rail 70 may be constructed from any suitable material. Like the bottom rail 24, the top rail 70 may be divided into three parts, a bottom portion 72, an intermediate portion 74, and a top portion 76. The bottom portion 72 defines a groove or opening 78, extending along its length, which is designed to receive an insert 80 and the top end 82 of the transparent pane 22. The top rail 70 also includes a groove 84 into which an insert 86 is placed. Among other functions, the insert 86 assists with preventing water from collecting in the groove 84.

Like the groove 50, the groove 84 is provided so that threaded fasteners may be inserted thereinto. As should be appreciated by those skilled in the art, the threaded fasteners affix male portions of snap fasteners to the top rail 70. This permits a flexible cover, such as a canvas cover, to be attached to the top rail 70.

Like the groove 50 in the bottom rail 24, the groove 84 in the top rail 70 provides a convenient location for providing an opening 88, which is part of the vent 90 of the invention. While the top vent 90 shares many of the same features as the bottom vent 10, the top vent 90 is provided with a different number, since there are differences between the top vent 90 and the bottom vent 10.

Figure 5:
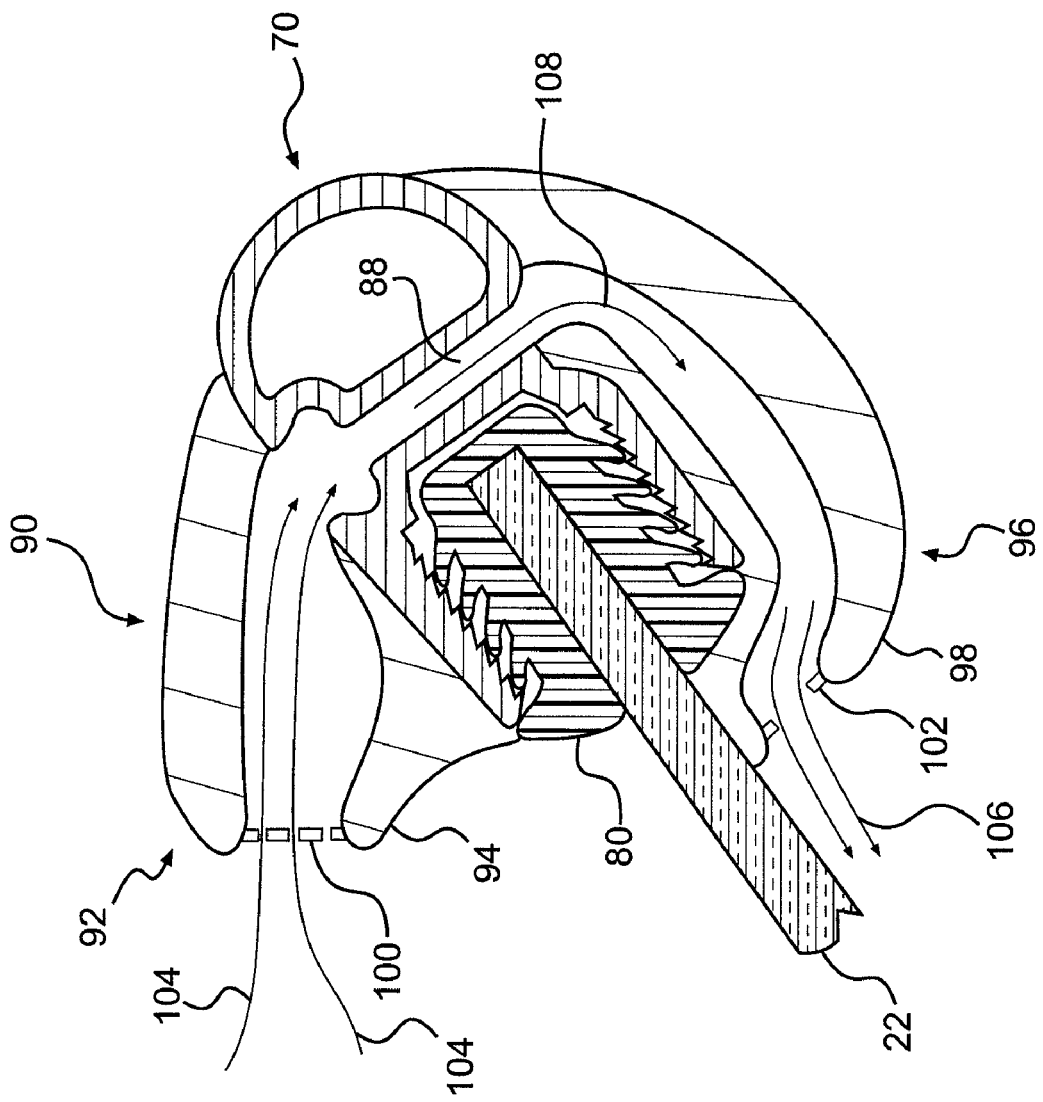
FIG. 5 is a cross-sectional side view illustration of one embodiment of a vent positioned at a top of the boat windshield.

Reference will now be made to FIG. 5, which provides a cross-section of the top vent 90. The opening 88 in the top rail 70 is illustrated in FIG. 5. Details of the vent 90, which is illustrated in cross-section in FIG. 5, are also shown. Specifically, the air intake 92 includes an air intake housing 94 disposed on the front side 16 of the windshield 18. The air discharge 96 includes an air discharge housing 98 disposed on the rear side 20 of the windshield 18. As also illustrated in FIG. 5, the air intake housing 94 includes an intake grill 100. The intake grill 100 prevents the ingestion of macroscopic materials, such as insects, by the vent 90. Similarly, the air discharge housing 98 includes a discharge grill 102, which may be employed for any number of purposes, including aesthetic ones.

With continued reference to FIG. 5, air from the front side 16 of the windshield 18 is forced into the air intake 92 when the boat moves in a forward direction. The intake air flow is indicated by arrows 104. The discharge air flow is indicated by arrows 106. The interior air flow, which encompasses the air flow within the vent 90, is indicated by arrows 108.

As FIG. 5 makes apparent, the intake air 104 passes through the intake grill 100, is routed through the opening 88 in the top rail 70, and exits from the discharge housing 98 at a position near the rear side 20 of the transparent pane 22. The discharge housing 98 is positioned such that the air discharge 106 is directed along the rear side 20 of the transparent pane 22, thereby removing any condensate that may have collected on the rear side 20 of the transparent pane 22.

Figure 6:
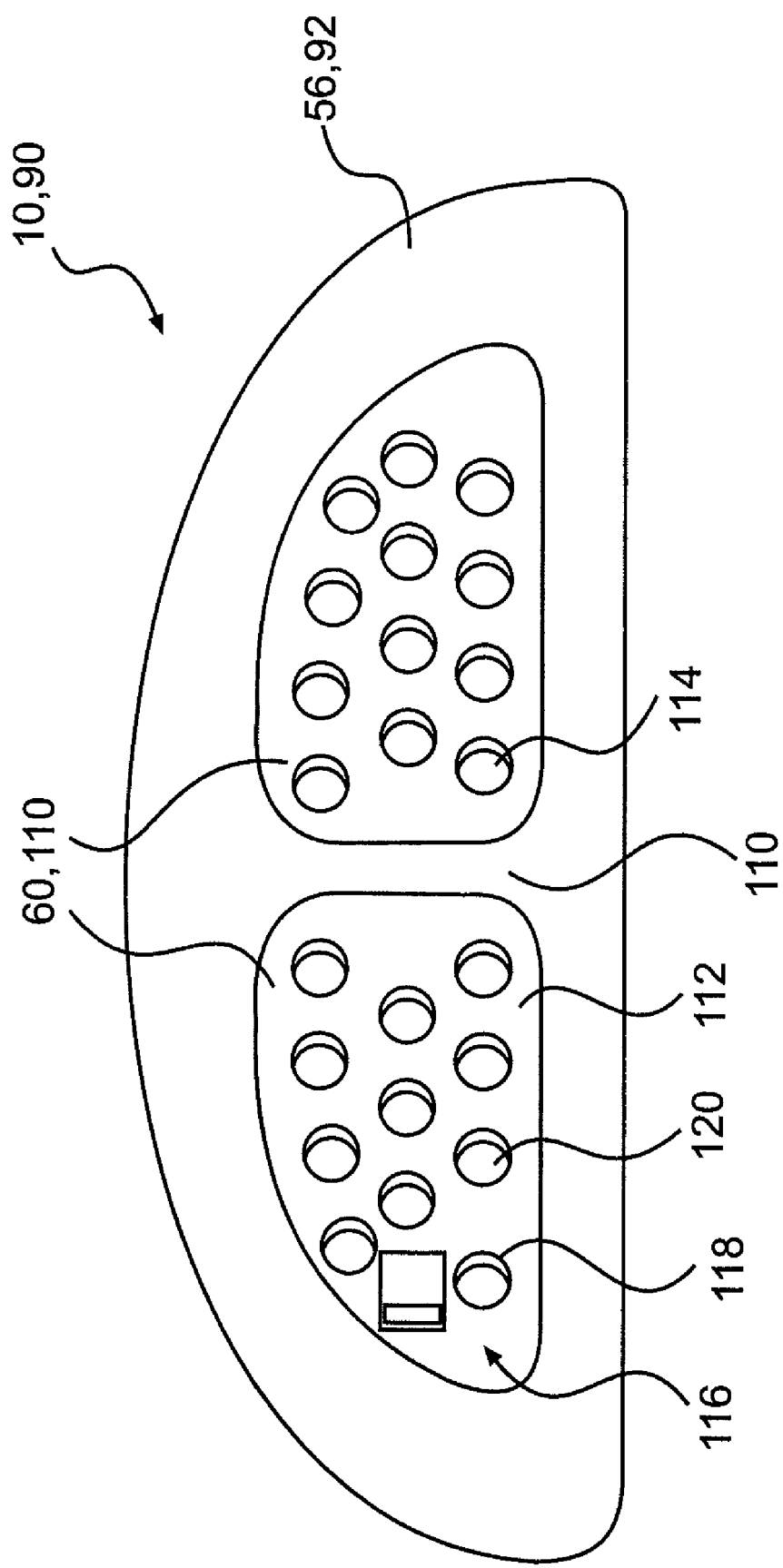
FIG. 6 is an elevational view of one embodiment of a front of a vent positioned at either the bottom or the top of a boat windshield.

FIG. 6, provides a front view of one contemplated embodiment of the bottom vent 10 or the top vent 90. The intake housing 56, 92 of the vent 10, 90 includes a septum 110 that defines two openings 112, 114. The openings 112, 114 include grills 60, 100, as discussed above.

Figure 7:
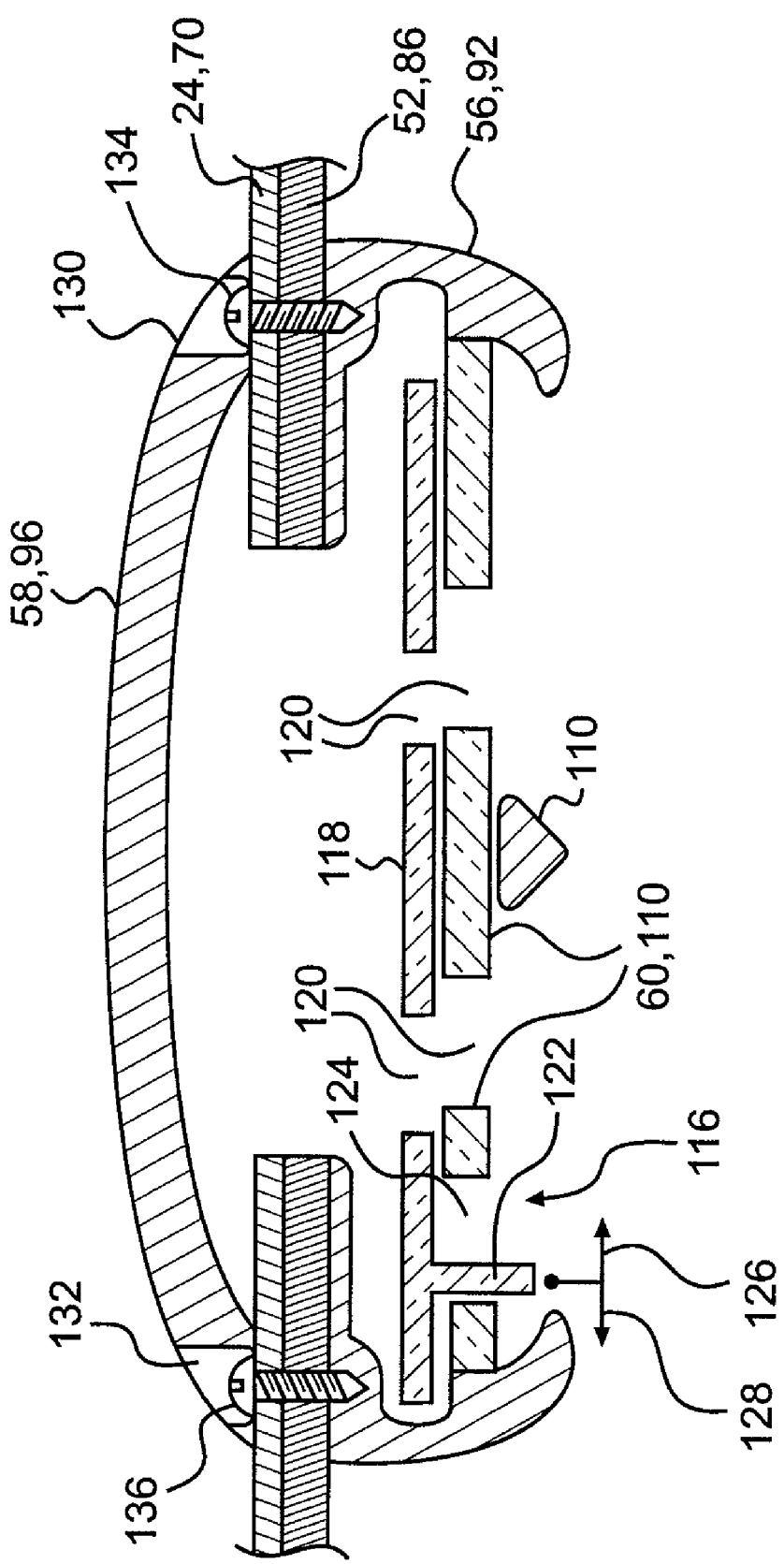
FIG. 7 is a cross-sectional top view of one embodiment of an assembled vent at the bottom or at the top of a windshield.

FIGS. 6 and 7 will now be discussed in connection with one further feature of one embodiment of the invention. Specifically, it may be desired by the boat operator to close one or more of the vents 10, 90 provided on the windshield 18. If so, a vent closure system 116 may be provided so that the vent(s) 10, 90 may be closed, thereby preventing air flow to the rear side 20 of the transparent pane 22.

The vent closure system 116 includes the grill 60, 100 combined together with a rear plate 118 in an offset fashion. The back plate 118 and the grill 60, 100 are slidably disposed adjacent to one another. Both the grill 60, 100 and the back plate 118 include openings 120 that are positioned coextensively with one another in the opened position. In the illustrated embodiment, the openings 120 are circular, but they may take any shape without departing from the scope of the invention.

The back plate 118 includes a protrusion 122 that extends through an opening 124 in the grill 60, 100. The boat operator (or other user) may apply a force to the protrusion 122 to shift the protrusion 122 in a linear fashion in either a right-hand 126 direction (with respect to FIG. 7) or in a left-hand direction 128. When shifted in the right-hand direction 126, the vent is closed because the rear plate 118 is shifted to the right. As a result, the holes 120 are no longer aligned with one another. When the protrusion 122 is shifted in the left-hand direction 128, the openings 120 are aligned with one another to permit air to flow through the vent 10, 90.

FIG. 7 also illustrates one possible arrangement for the connection of the air intake housing 56, 92 and the air discharge housing 58, 98 to the rail 24, 70. As illustrated, the air discharge housing 58, 98 includes two indentations 130, 132 into which screws 134, 136 may be inserted. The screws 134, 136 may extend from the air discharge housing 58, 98, through the rail 24, 70 and into the air intake housing 56, 92 thereby securing the structures together. As should be appreciated by those skilled in the art, other attachment schemes may be employed, including adhesives, without departing from the scope of the invention.

In connection with the vent closure system 116, it is noted that a similar system maybe employed with respect to the grill 102, 138 incorporated into the air discharge housing 58, 98. This system is not illustrated herein since it would be, for the most part, repetitive of the discussion of the vent closure system 116 discussed above. If a vent closure system is provided on the air discharge housing 58, 98, a boat operator may close the vent from the interior of the boat, rather than from the exterior, which provides additional convenience. In addition, it is contemplated that a vent closure may be provided both with respect to the air intake housing 56, 92 and the air discharge housing 58, 98 without departing from the scope of the invention.

The embodiments discussed herein are meant to be illustrative of the broad scope of the invention. They are not meant to be limiting of the invention solely to the embodiments described or illustrated. To the contrary, as should be appreciated by those skilled in the art, there are variations and equivalents of the invention that may be employed. The invention is intended to encompass those variations and embodiments.

What is claimed is:

1. A boat windshield, comprising:
    a transparent pane, defining a bottom edge and a top edge and defining a front surface and a rear surface;
    a rail disposed adjacent and secured to one of either the bottom or the top edge of the transparent pane, the rail defining a front surface and a rear surface;
    an opening defined through the rail;
    an air intake housing secured to the front surface of the rail;
    an air intake opening defined in the air intake housing;
    an air intake passageway defined by the air intake housing;
    an air discharge housing secured to the rear surface of the rail;
    an air discharge opening defined in the air discharge housing; and
    an air discharge passageway defined by the air discharge housing;
    wherein the air intake passageway, the opening through the rail, and the air discharge passageway define an air pathway from the front surface to the rear surface of the rail, and
    wherein the air discharge opening is positioned adjacent to the rear surface of the transparent pane to direct air along the rear surface of the transparent pane upon exiting the air discharge housing.

2. The boat windshield of claim 1, wherein the transparent pane comprises a transparent material including at least one of glass, acrylic, or polycarbonate.

3. The boat windshield of claim 1, wherein the rail is a bottom rail disposed adjacent to the bottom edge of the transparent pane.

4. The boat windshield of claim 1, wherein the rail is a top rail disposed adjacent to the top edge of the transparent pane.

5. The boat windshield of claim 3, further comprising: a top rail disposed adjacent to the top edge of the transparent pane.

6. The boat windshield of claim 5, further comprising:
an opening defined through the top rail;
an air intake housing secured to the front surface of the top rail;
an air intake opening defined in the air intake housing;
an air intake passageway defined by the air intake housing;
an air discharge housing secured to the rear surface of the top rail;
an air discharge opening defined in the rear air discharge housing; and
an air discharge passageway defined by the rear air discharge housing;
wherein the air intake passageway, the opening through the rail, and the air discharge passageway define an air pathway from the front surface to the rear surface of the top rail, and
wherein the air discharge opening is positioned adjacent to the rear surface of the transparent pane to direct air along the rear surface of the transparent pane upon exiting the air discharge housing.

7. The boat windshield of claim 1, wherein the rail comprises at least one selected from aluminum, steel, stainless steel, a composite material, or plastic.

8. The boat windshield of claim 1, further comprising:
a closure system provided in the one of either the air intake housing or the air discharge housing to permit selective closure of the air pathway.

9. The boat windshield of claim 8, wherein the closure system comprises:
a first plate;
a plurality of first openings defined through the first plate;
a second plate disposed slidably behind the first plate; and
a plurality of second openings defined through the second plate;
wherein the first and the second plates are slidably disposed adjacent to one another such that, in an open position, the first and second openings are in register with one another thereby permitting air flow through the air passageway and, in a closed position, the first and second openings are not in register with one another thereby preventing air flow through the air passageway.

10. The boat windshield of claim 9, further comprising:
a protrusion extending from a front surface of the second plate through an opening in the first plate,
wherein application of a force to the protrusion moves the second plate with respect to the first plate between the open and the closed positions.

11. The boat windshield of claim 9, wherein the first plate is a grill positioned adjacent to an entrance to the air intake opening of the air intake housing.

12. The boat windshield of claim 9, wherein the first plate is a grill positioned adjacent to an exit to the air discharge opening of the air discharge housing.

13. A vent for a boat windshield comprising:
an air intake housing securable to a front surface of a rail;
an air intake opening defined in the air intake housing;
an air intake passageway defined by the air intake housing;
an air discharge housing securable to a rear surface of a rail;
an air discharge opening defined in the rear air discharge housing; and
an air discharge passageway defined by the rear air discharge housing;
wherein the air intake passageway and the air discharge passageway define an air pathway, and
wherein the air discharge opening is positionable adjacent to a rear surface of the boat windshield to direct air along the rear surface of the boat windshield upon exiting the air discharge housing.

14. The boat windshield of claim 13, further comprising:
a closure system provided in the one of either the air intake housing or the air discharge housing to permit selective closure of the air pathway.

15. The boat windshield of claim 14, wherein the closure system comprises:
a first plate;
a plurality of first openings defined through the first plate;
a second plate disposed slidably behind the first plate; and
a plurality of second openings defined through the second plate;
wherein the first and the second plates are slidably disposed adjacent to one another such that, in an open position, the first and second openings are in register with one another thereby permitting air flow through the air passageway and, in a closed position, the first and second openings are not in register with one another thereby preventing air flow through the air passageway.

16. The boat windshield of claim 14, further comprising:
a protrusion extending from a front surface of the second plate through an opening in the first plate,
wherein application of a force to the protrusion moves the second plate with respect to the first plate between the open and the closed positions.

17. The boat windshield of claim 14, wherein the first plate is a grill positioned adjacent to an entrance to the air intake opening of the air intake housing.

18. The boat windshield of claim 14, wherein the first plate is a grill positioned adjacent to an exit to the air discharge opening of the air discharge housing.

* * * * *